United States Patent
Engelke et al.

(10) Patent No.: US 6,567,503 B2
(45) Date of Patent: May 20, 2003

(54) REAL-TIME TRANSCRIPTION CORRECTION SYSTEM

(75) Inventors: Robert M. Engelke, Madison, WI (US); Kevin R. Colwell, Middleton, WI (US); Troy D. Vitek, Madison, WI (US); Kurt M. Gritner, Madison, WI (US); Jayne M. Turner, Madison, WI (US); Pamela A. Frazier, Mount Horeb, WI (US)

(73) Assignee: Ultratec, Inc., Madison, WI (US)

( * ) Notice: Subject to any disclaimer, the term of this patent is extended or adjusted under 35 U.S.C. 154(b) by 21 days.

(21) Appl. No.: 09/789,120

(22) Filed: Feb. 20, 2001

(65) Prior Publication Data

US 2001/0005825 A1 Jun. 28, 2001

Related U.S. Application Data

(63) Continuation-in-part of application No. 09/288,420, filed on Apr. 8, 1999, which is a continuation of application No. 08/925,558, filed on Sep. 8, 1997, now Pat. No. 5,909,482.

(51) Int. Cl.[7] .......................... H04M 11/00; H04M 1/64
(52) U.S. Cl. ................... 379/52; 379/88.16; 379/93.09; 379/93.15; 379/88.14; 379/100.09
(58) Field of Search .................. 379/52, 88.01, 379/88.14, 93.05, 93.09, 93.15, 93.18, 93.27, 100.09, 88.16

(56) References Cited

U.S. PATENT DOCUMENTS

| | | | | |
|---|---|---|---|---|
| 5,289,523 A | * | 2/1994 | Vadile et al. | 379/52 |
| 5,351,288 A | | 9/1994 | Engelke | 379/98 |
| 5,574,784 A | * | 11/1996 | LaPadula et al. | 379/309 |
| 5,680,443 A | * | 10/1997 | Kasday et al. | 379/67 |
| 5,712,901 A | * | 1/1998 | Meermans | 379/88 |
| 5,724,405 A | | 3/1998 | Engelke | 379/52 |
| 5,809,112 A | | 9/1998 | Ryan | |
| 5,909,482 A | | 6/1999 | Engelke | |
| 5,974,116 A | | 10/1999 | Engelke | 379/52 |
| 6,175,819 B1 | | 1/2001 | Van Alstine | |

* cited by examiner

Primary Examiner—Allan Hoosain
(74) Attorney, Agent, or Firm—Quarles & Brady LLP (57) ABSTRACT

An editing system for real-time remote transcription, such as may be used by deaf or hearing impaired individuals, displays transcribed text on a screen prior to transmission so that a human call assistant may identify words being held in a buffer by their spatial location on the screen to initiate a correction of those words either through speech or text entry.

34 Claims, 5 Drawing Sheets

REAL-TIME TRANSCRIPTION CORRECTION SYSTEM

CROSS-REFERENCE TO RELATED APPLICATIONS

This application is a continuation-in-part on Ser. No. 09/288,420 filed Apr. 8, 1999 which is a continuation of U.S. Ser. No. 08/925,558, now U.S. Pat. No. 5,909,482 filed Sep. 8, 1997.

STATEMENT REGARDING FEDERALLY SPONSORED RESEARCH OR DEVELOPMENT

None.

BACKGROUND OF THE INVENTION

The present invention relates to systems for transcribing voice communications into text and specifically to a system facilitating real-time editing of a transcribed text stream by a human call assistant for higher accuracy.

A system for real-time transcription of remotely spoken voice signals is described in U.S. Pat. No. 5,909,482 assigned to the same assignee as the present invention and hereby incorporated by reference. This system may find use implementing both a "captel" (caption telephone) in which a user receives both voice and transcribed text through a "relay" from a remote second party to a conversation, and a "personal interpreter" in which a user receives, through the relay, a text transcription of words originating from the location of the user.

In either case, a human "call assistant" at the relay listens to the voice signal and "revoices" the words to a speech recognition computer program tuned to that call assistant's voice. Revoicing is an operation in which the call assistant repeats, in slightly delayed fashion, the words she or he hears. The text output by the speech recognition system is then transmitted to the captel or personal interpreter. Revoicing by the call assistant overcomes a current limitation of computer speech recognition programs that they currently need to be trained to a particular speaker and thus, cannot currently handle direct translation of speech from a variety of users.

Even with revoicing and a trained call assistant, some transcription errors may occur, and therefore, the above-referenced patent also discloses an editing system in which the transcribed text is displayed on a computer screen for review by the call assistant.

BRIEF SUMMARY OF THE INVENTION

The present invention provides for a number of improvements in the editing system described in the above-referenced patent to speed and simplify the editing process and thus generally improve the speed and accuracy of the transcription. Most generally, the invention allows the call assistant to select those words for editing based on their screen location, most simply by touching the word on the screen. Lines of text are preserved intact as they scroll off the screen to assist in tracking individual words and words on the screen change color to indicate their status for editing and transmission. The delay before transmission of transcribed text may be adjusted, for example, dynamically based on error rates, perceptual rules, or call assistant or user preference.

The invention may be used with voice carryover in a caption telephone application or for a personal interpreter or for a variety of transcription purposes. As described in the parent application, the transcribed voice signal may be buffered to allow the call assistant to accommodate varying transcription rates, however, the present invention also provides more sophisticated control of this buffering by the call assistant, for example adding a foot control pedal, a graphic buffer gauge and automatic buffering with invocation of the editing process. Further, the buffered voice signal may be processed for "silence compression" removing periods of silence. How aggressively silence is removed may be made a function of the amount of signal buffered.

The invention further contemplates the use of keyboard or screen entry of certain standard text in conjunction with revoicing particularly for initial words of a sentence which tend to repeat.

The above aspects of the inventions are not intended to define the scope of the invention for which purpose claims are provided. Not all embodiments of the invention will include all of these features.

In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE INVENTION

Figure 1:
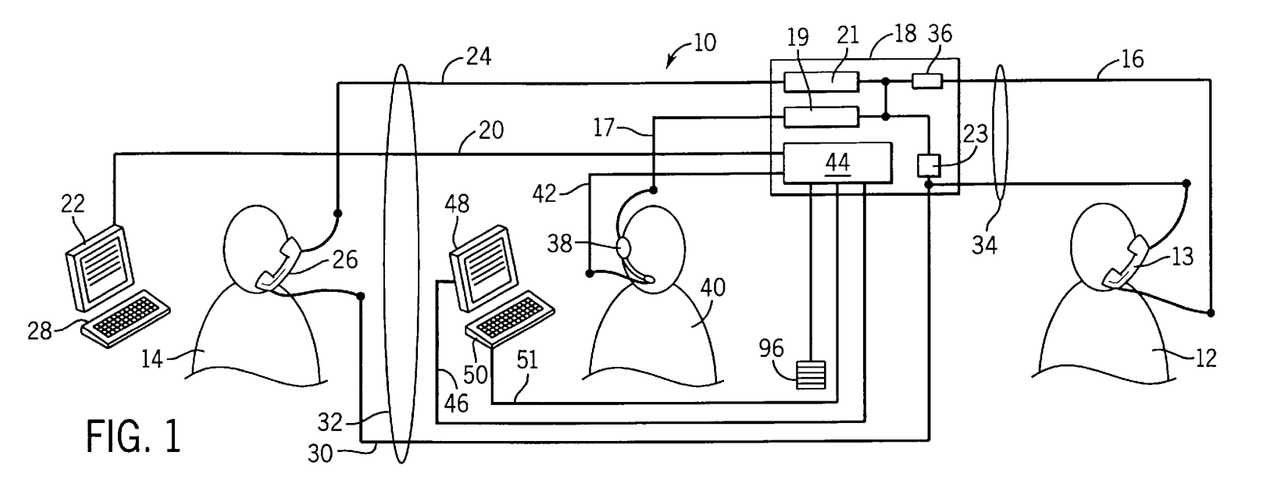
FIG. 1 is a schematic diagram of a voice relay used with a captioned telephone such as may make use of the present invention and showing a call assistant receiving a voice signal for revoicing to a computer speech recognition program and reviewing the transcribed text on a display terminal.

Referring now to FIG. 1, a relay 10, permitting a hearing user 12 to converse with a deaf or hearing impaired user 14, receives a voice signal 16 from the mouthpiece of handset 13 of the hearing user 12. The voice signal 16 is processed by the relay 10 to produce a text stream signal 20 sent to the deaf or hearing impaired user 14 where it is displayed at a user terminal 22. Optionally, a modified voice signal 24 may also be provided to the earpiece of a handset 26 used by the deaf or hearing impaired user 14.

The deaf or hearing impaired user 14 may reply via a keyboard 28 per conventional relay operation through a connection (not shown for clarity) or may reply by spoken word into the mouthpiece of handset 26 to produce voice signal 30. The voice signal 30 is transmitted directly to the earpiece of handset 13 of the hearing user 12.

The various signals 24, 20 and 30 may travel through a single conductor 32 (by frequency division multiplexing or data multiplexing techniques known in the art) or may be separate conductors. Equally, the voice signal 30 and voice signal 16 may be a single telephone line 34 but may also be multiple lines.

In operation, the relay 10 receives the voice signal 16 at computer 18 through an automatic gain control 36 providing an adjustment in gain to compensate for various attenuations of the voice signal 16 in its transmission. It is then combined with an attenuated version of the voice signal 30 (the other half of the conversation) arriving via attenuator 23. The voice signal 30 provides the call assistant 40 with context for a transcribed portion of the conversation. The attenuator 23 modifies the voice signal 30 so as to allow the call assistant 40 to clearly distinguish it from the principal transcribed conversation from user 12. Other forms of discriminating between these two voices may be provided including, for example, slight pitch shifting or filtering.

The combined voice signals 16 and 30 are then received by a "digital tape recorder" 19 and output after buffering by the recorder 19 as headphone signal 17 to the earpiece of a headset 38 worn by a call assistant 40. The recorder 19 can be controlled by a foot pedal 96 communicating with computer 18. The call assistant 40, hearing the voice signal 16, revoices it by speaking the same words into the mouthpiece of the headset 38. The call assistant's spoken words 42 are received by a speech processor system 44, to be described, which provides an editing text signal 46 to the call assistant display 48 indicating a transcription of the call assistant's voice as well as other control outputs and may receive keyboard input from call assistant keyboard 50.

The voice signal 16 after passing through the automatic gain control 36 is also received by a delay circuit 21, which delays it to produce the delayed, modified voice signal 24 provided to the earpiece of a handset 26 used by the deaf or hearing impaired user 14.

Figure 2:
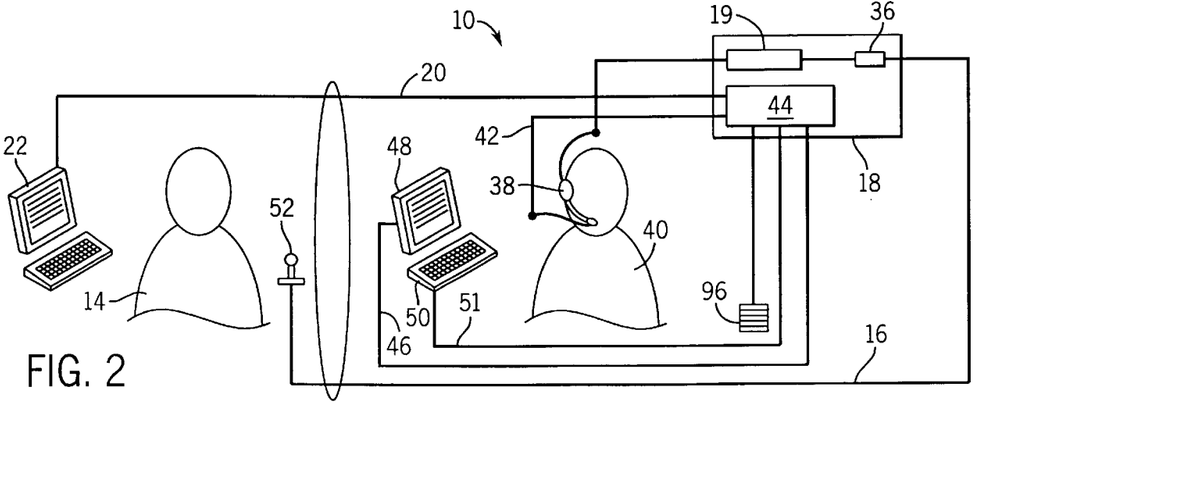
FIG. 2 is a figure similar to that of FIG. 1 showing a relay used to implement a personal interpreter in which the speech signal and the return text are received and transmitted to a single location.

Referring now to FIG. 2, the relay 10 may also be used with a deaf or hearing impaired individual 14 using a personal interpreter. In this case a voice signal from a source proximate to the deaf or hearing impaired user 14 is received by a microphone 52 and relayed to the computer 18 as the voice signal 16. That signal 16 (as buffered by recorder 19) is again received by the earpiece of headset 38 of the call assistant 40 who revoices it as a spoken words 42.

In both the examples of FIGS. 1 and 2, the spoken words 42 from the call assistant 40 are received by speech processor system 44 which produces an editing text signal 46 separately and prior to text stream signal 20. The editing text signal 46 causes text to appear on call assistant display 48 that may be reviewed by the call assistant 40 for possible correction using voicing or the keyboard 50 prior to being converted to a text stream signal 20.

Figure 4:
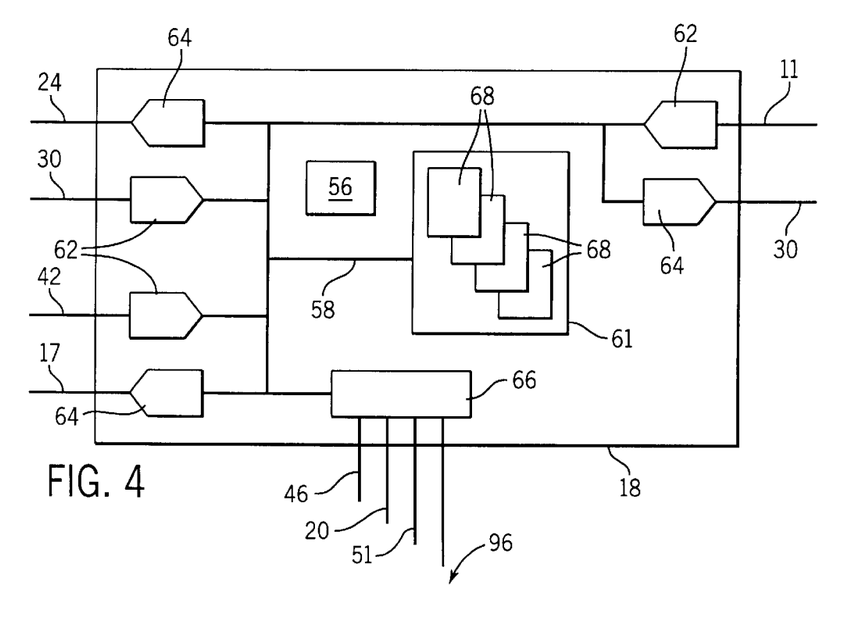
FIG. 4 is a generalized block diagram of the computer system of FIGS. 1 and 2 used for one possible implementation of the present invention according to a stored program.

Referring now to FIG. 4, the relay computer 18 may be implemented by an electronic processor 56 possibly including one or more conventional microprocessors and a digital signal processor joined on a bus 58 with a memory 60. The bus 58 may also communicate with various analog to digital converters 62 providing for inputs for signals 16, 30 and 42, various digital to analog converters 64 providing outputs for signals 30, 24 and 17 as well as digital I/O circuits 66 providing inputs for keyboard signal 51 and foot pedal 96 and outputs for text stream signal 20 and pre-edited editing text signal 46.

Figure 8:
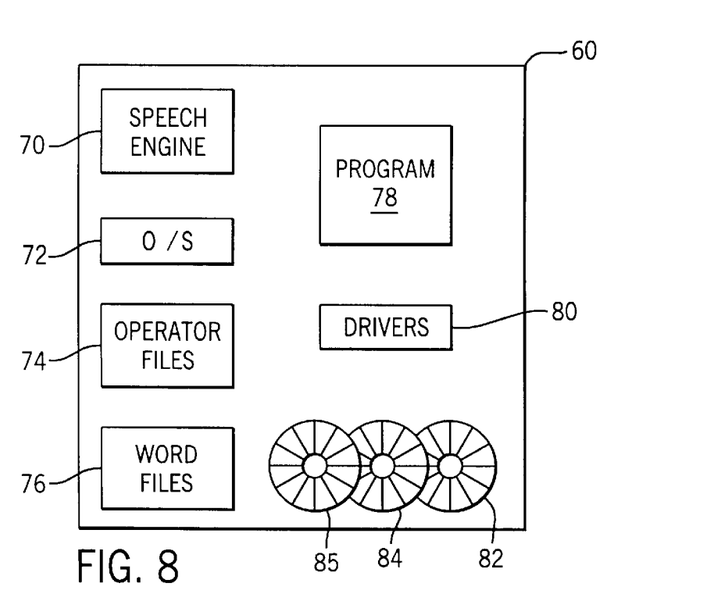
FIG. 8 is a graphical representation of the memory of the computer of FIG. 4 showing data structures and programs used in the implementation of the present invention.

Referring now to FIG. 8, the memory 60 includes a speech recognition program 70, such as the Via Voice program manufactured by the IBM Corporation, of a type well known in the art. The speech recognition program 70 operates under an operating system 72, such as the Windows operating system manufactured by the Microsoft Corporation, also known in the art. The speech recognition program 70 creates files 74 and 76 as part of its training to a particular speaker and to the text it is likely to receive. File 74 is a call assistant specific file relating generally to the pronunciation of the particular call assistant. File 76 is call assistant independent and relates to the vocabulary or statistical frequency of word use that will be transcribed text—dependant on the pool of callers not the call assistant 40. File 76 will be shared among multiple call assistants in contrast to conventions for typical training of a speech recognition program 70, however, file 74 will be unique to and used by only one call assistant 40 and thus is duplicated (not shown) for a relay having multiple call assistants 40.

The memory 60 also includes program 78 of the present invention providing for the editing features and other aspects of the invention as will be described below and various drivers 80 providing communication of text and sound and keystrokes with the various peripherals described under the operating system 72. Memory 60 also provides a circular buffer 82 implementing recorder 19, circular buffer 84 implementing delay 21 (both shown in FIG. 1) and circular buffer 85 providing a queue for transcribed text prior to transmission. Operation of these buffers is under control of the program 78 as will be described below.

Figure 5:
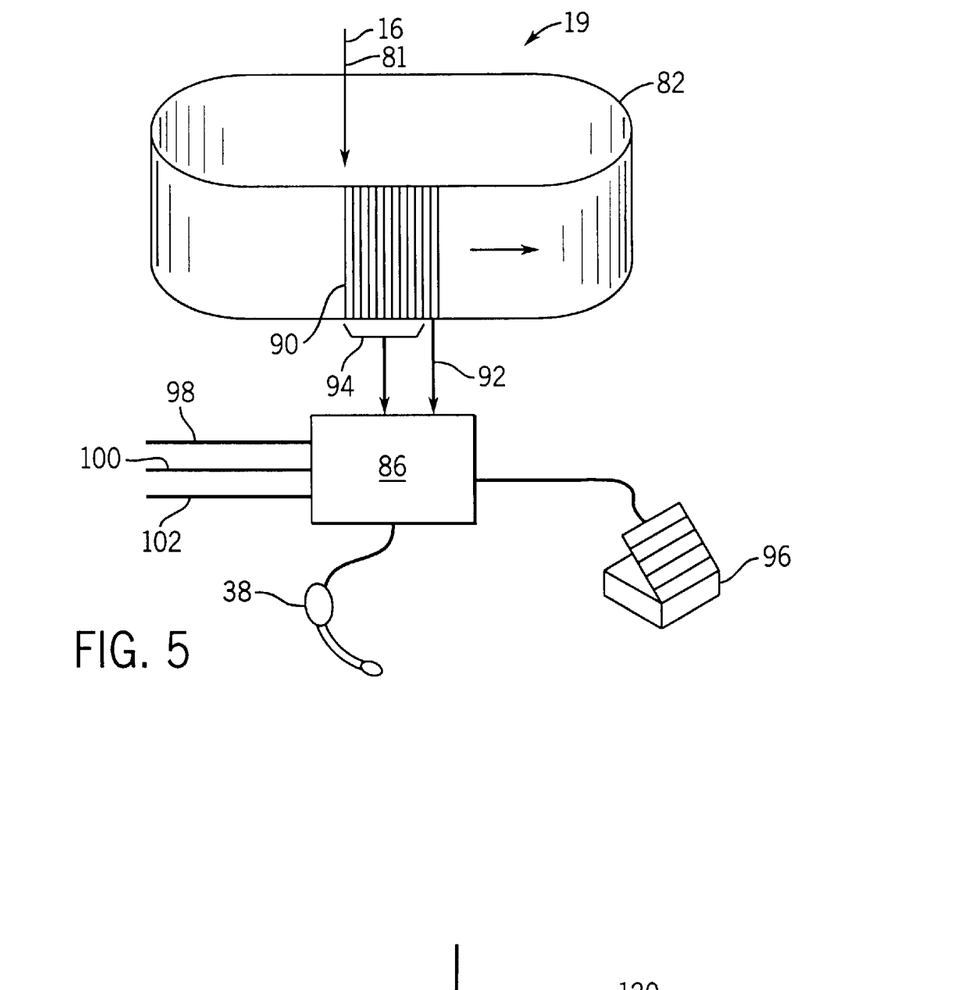
FIG. 5 is a pictorial representation of a buffer system receiving a voice signal prior to transcription by the call assistant such as may be implemented by the computer of FIG. 4.

Referring now to FIGS. 1 and 5, the voice signal 16 as received by the recorder, as circular buffer 82 then passes through a silence suppression block 86 implemented by program 78. Generally, as voice signal 16 is received, it is output to circular buffer 82 at a record point determined by a record pointer 81 to be recorded in the circular buffer 82 as a series of digital words 90. As determined by a playback pointer 92, these digital words 90, somewhat later in the circular buffer 82, are read and converted by means of digital to analog converter 64 into headphone signal 17 communicated to headset 38. Thus, the call assistant 40 may occasionally pause the playback of the headphone signal 17 without loss of voice signal 16 which is recorded by the circular buffer 82. The difference between the record pointer 81 and the playback pointer 92 defines the buffer fill length 94 which is relayed to the silence suppression block 86.

Figure 3:
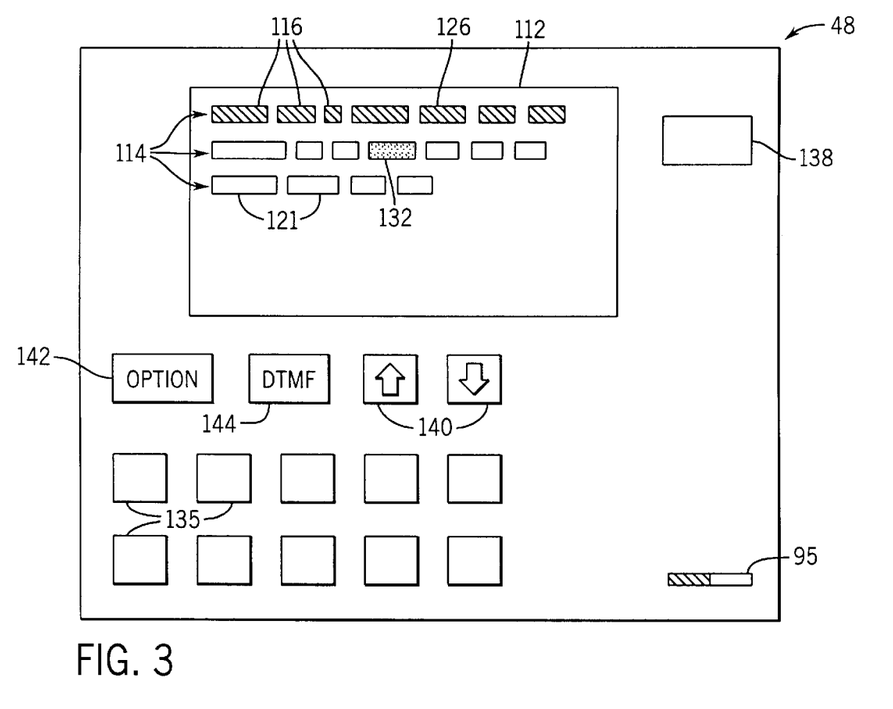
FIG. 3 is a simplified elevational view of the terminal of FIGS. 1 and 2 as viewed by the call assistant.

The buffer fill length 94 may be displayed on the call assistant display 48 shown in FIG. 3 by means of a bar graph 95 having a total width corresponding to total size of the circular buffer 82 and a colored portion concerning the buffer fill length 94. Alternatively, a simple numerical percentage display may be provided. In this way the call assistant may keep tabs of how far behind she or he is in revoicing text.

The foot pedal 96 may be used to control movement of the playback pointer 92 in much the same way as a conventional office dictation unit. While the foot pedal 96 is released, the playback pointer 92 moves through the circular buffer 82 at normal playback speeds. When the pedal is depressed, playback pointer 92 stops and when it is released, playback pointer 92 backs up in the buffer 82 by a predetermined amount and then proceeds forward at normal playing speeds. Depression of the foot pedal 96 may thus be used to pause or replay difficult words.

As the buffer fill length 94 increases beyond a predetermined amount, the silence suppression block 86 may be activated to read the digital words 90 between the record pointer 81 and playback pointer 92 to detect silences and to remove those silences, thus shortening the amount of buffered data and allowing the call assistant to catch up to the conversation. In this regard, the silence suppression block 86 reviews the digital words 90 between the playback pointer 92 and the record pointer 81 for those indicating an amplitude of signal less than a predetermined squelch value. If a duration of consecutive digital words 90 having less than the squelch value, is found exceeding a predetermined time limit, this silence portion is removed from the circular buffer 82 and replaced with a shorter silence period being the minimum necessary for clear distinction between words. The silence suppression block 86 then adjusts the playback pointer 92 to reflect the shortening of the buffer fill length 94.

As described above, in a preferred embodiment, the silence suppression block 86 is activated only after the buffer fill length 94 exceeds a predetermined volume. However, it may alternatively be activated on a semi-continuous basis using increasingly aggressive silence removing parameters as the buffer fill length 94 increases. A squelch level 98, a minimum silence period 100, and a silence replacement value 102 may be adjusted as inputs to this silence suppression block 86 as implemented by program 78.

Figure 6:
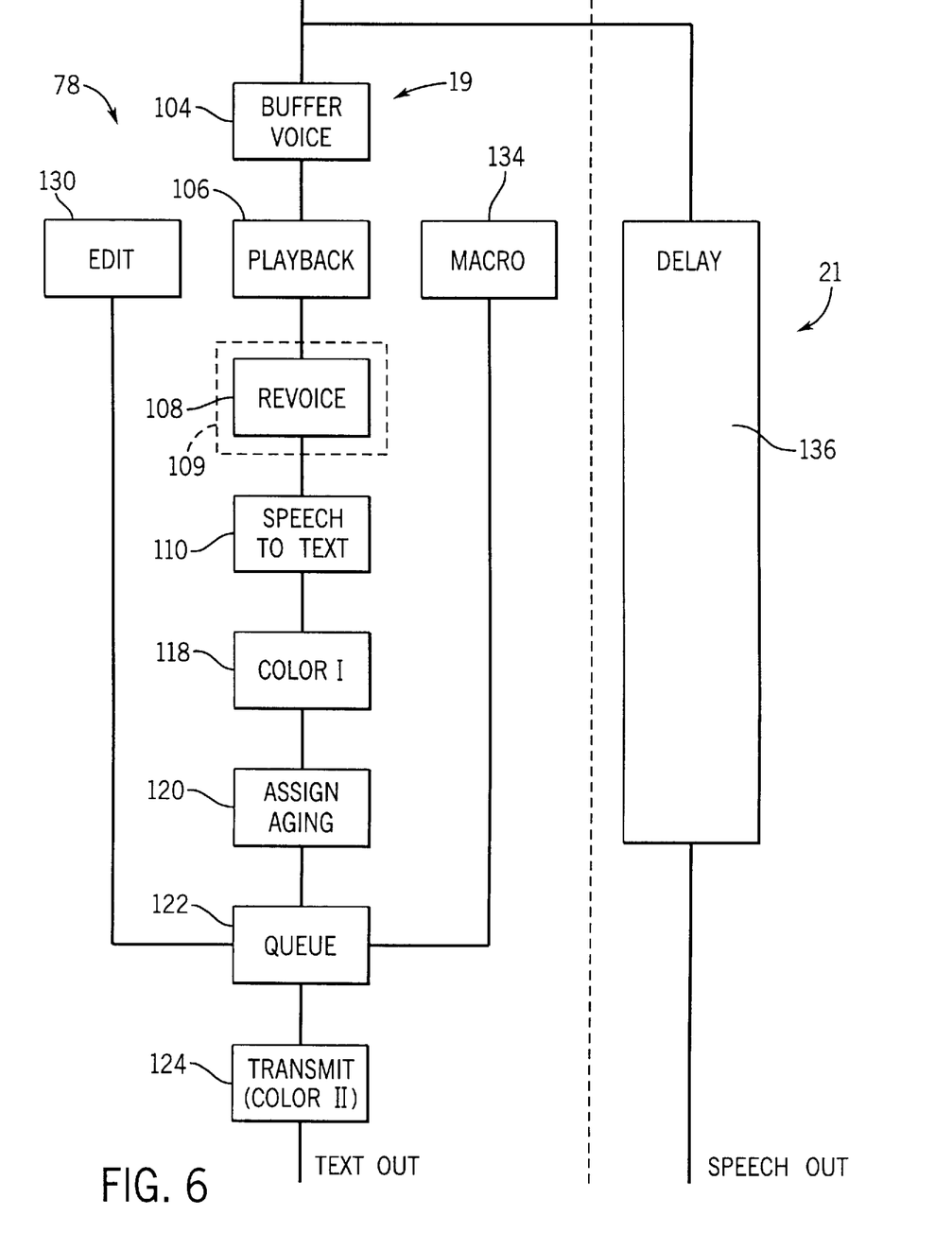
FIG. 6 is a flowchart showing the elements of the program of FIG. 4 such as may realize the present invention including controlling the aging of transcribed text prior to transmission.

Referring now to FIG. 6, after the program 78 receives the voice signal 16 onto circular buffer 82 as indicated by process block 104, provided the call assistant has not depressed the pedal 96, the headphone signal 17 is played back as indicated by process block 106 to be received by the call assistant 40 and revoiced as indicated by process block 108, a process outside the program as indicated by the dotted line 109. The program 78 then connects the speech signal 42 from the call assistant 40 to the speech recognition program 70 as indicated by process block 110 where it is converted to text and displayed on the call assistant display 48.

Referring now to FIG. 3, the text is displayed within a window 112 on the call assistant display 48 and arranged into lines 114. The lines 114 organize individual text words 116 into a left to right order as in a book and preserves a horizontal dimension of placement as the lines 114 move upward ultimately off of the window 112 in a scrolling fashion as text is received and transmitted. Preserving the integrity of the lines allows the call assistant 40 to more easily track the location of an individual word 116 during the scrolling action.

The most recently generated text, per process block 110, is displayed on the lowermost line 114 which forms on a word by word basis.

At process block 118, the words 121 of the lowermost line are given a first color (indicated in FIG. 3 by a lack of shading) which conveys that they have not yet been transmitted to the deaf or hearing impaired individual 14.

At process block 120 the words are assigned an aging value indicating how long they will be retained in a circular buffer 85 prior to being transmitted and hence how long they will remain the first color. The assignment of the aging values can be dynamic or static according to values input by the call assistant 40 as will be described below.

As indicated by process block 122, the circular buffer 85 forms a queue holding the words prior to transmission.

At process block 124, the words are transmitted after their aging and this transmission is indicated changing their representation on the display 48 to a second color 126, indicated by crosshatching in FIG. 3. Note that even after transmission, the words are still displayed so as to provide continuity to the call assistant 40 in tracking the conversation in text form.

Prior to the words being colored the second color 126 and transmitted (thus while the words are still in the queue 122), a correction of transcription errors may occur. For example, as indicated by process block 130, the call assistant 40 may invoke an editing routine by selecting one of the words in the window 112, typically by touching the word as it is displayed and detecting that touch using a touch screen. Alternatively, the touch screen may be replaced with more conventional cursor control devices. The particular touched word 132 is flagged in the queue and the activation of the editing process by the touch causes a stopping of the playback pointer 92 automatically until the editing process is complete.

Once a word is selected, the call assistant 40 may voice a new word to replace the flagged word or type in a new word or use another conventional text entry technique to replace the word in the queue indicated by process block 122. The mapping of words to spatial locations by the window 112 allows the word to be quickly identified and replaced while it is being dynamically moved through the queue according to its assigned aging. When the replacement word is entered, the recorder 19 resumes playing.

As an alternative to the playback and editing processes indicated by process block 106 and 130, the call assistant 40 may enter text through a macro key 135 as indicated by process block 134. These macro keys 135 place predetermined words or phrases into the queue with the touch of the macro key 135. The words or phrases may include conversational macros, such as words placed in parentheses to indicate nonliteral context, such as (holding), indicating that the user is waiting for someone to come online, (sounds) indicating nonspoken sounds necessary to understand a context, and the (unclear) indicating a word is not easily understood by the call assistant. Similarly, the macros may include call progress macros such as those indicating that an answering machine has been reached or that the phone is ringing. Importantly, the macros may include common initial words of a sentence or phrase, such as "okay", "but", "hello", "oh", "yes", "um", "so", "well", "no", and "bye" both to allow these words to be efficiently entered by the call assistant 40 without revoicing.

The macro keys 135 for common initial words allow these words to be processed with reduced delay of the speech to text step 110 and error correction of editing process block 130. It has been found that users are most sensitive to delay in the appearance of these initial words and thus that reducing them much improves the comprehensibility and reduces frustration in the use of the system.

The voice signal received by the buffer as indicated by process block 104 is also received by a delay line 136 implemented by circular buffer 84 and adjusted to provide delay in the voice so that the voice signal arrives at the caption telephone or personal interpreter at approximately the same time as the text. This synchronizing reduces confusion by the user.

Referring now to FIG. 3, the call assistant display 48 operating under the control of the program 78 may provide for a status indicator 138 indicating the status of the hardware in making connections to the various users and may include the volume control buttons 140 allowing the call assistant 40 to independently adjust the volume of the spoken words up or down for his or her preference. An option button 142 allows the call assistant to control the various parameters of the editing and speech recognition process.

A DTMF button 144 allows the call assistant to directly enter DTMF tones, for example, as may be needed for a navigation through a menu system. Pressing of the button 144 converts the macro key 135 to a keypad on a temporary basis.

Figure 7:
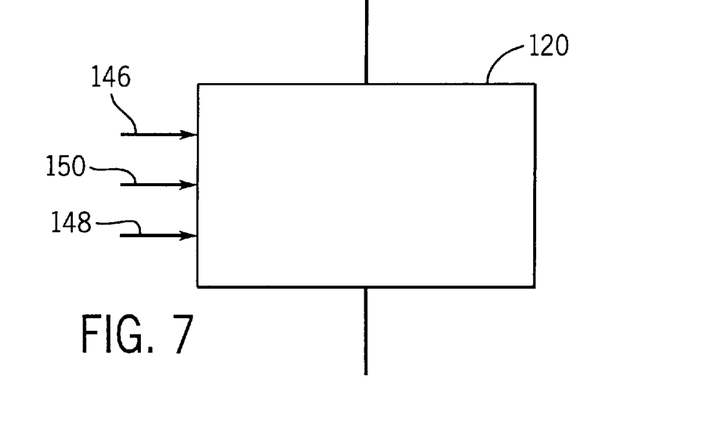
FIG. 7 is a detailed view of one flowchart block of FIG. 6 such as controls the aging of text showing various inputs that may affect the aging time.

Referring now to FIG. 7, the assignment of aging of text per process block 120 may be functionally dependant on several parameters. The first parameter 146 is the location of the particular word within a block of the conversation or sentence. It has been found that reduced delay (aging) in the transmission of these words whether or not they are entered through the macro process 134 or the revoicing of process block 108, decreases consumer confusion and frustration by reducing the apparent delay in the processing.

Error rates, as determined from the invocation of the editing process of process block 130 may be used to also increase the aging per input 148. As mentioned, the call assistant may control the aging through the option button 142 shown in FIG. 3 (indicated by input 150) with inexperienced call assistants 40 selecting for increased aging time.

Figure 9:
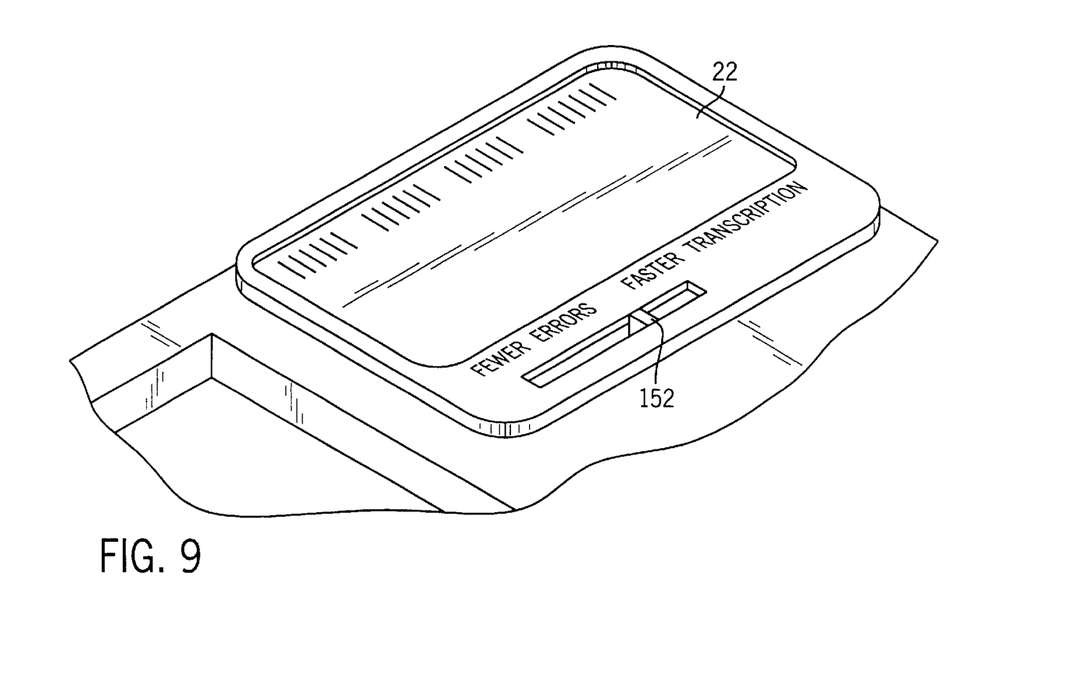
FIG. 9 is a fragmentary view of a caption telephone of FIG. 1 showing a possible implementation of a user control for controlling a transcription speed accuracy tradeoff.

Importantly, the deaf or hearing impaired user 14 may also control this aging time. Referring to FIG. 9, the user's terminal 22 may include, for example, a slider control 152 providing for a range of locations between a "faster transcription" setting at one end and "fewer errors" setting at the other end. Thus the user may control the aging time to mark a preference between a few errors but faster transcription or much more precise transcription at the expense of some delay.

It will be understood that the mechanisms described above may also be realized in collections of discrete hardware rather than in an integrated electronic computer according to methods well known in the art.

It should be noted that the present invention provides utility even against the expectation of increased accuracy in computer speech recognition and it is therefore considered to cover applications where the call assistant may perform no or little revoicing while using the editing mechanisms described above to correct for machine transcription errors.

It will be understood that the digital tape recorder 19, including the foot pedal 96 and the silence suppression block 86 can be equally used with a conventional relay in which the call assistant 40 receiving a voice signal through the headset 38 types, rather than revoices, the signal into a conventional keyboard 50. In this case the interaction of the digital tape recorder 19 and the editing process may be response to keyboard editing commands (backspace etc) rather than the touch screen system described above. A display may be used to provide the bar graph 95 to the same purposes as that described above.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. An editing system for voice transcription comprising:
   an input circuit receiving a voice signal including at least one spoken word from a remote source;
   a speech engine generating input text corresponding to the voice signal, the input text including a text word corresponding to the spoken word;
   a memory receiving the input text to store the same;
   a display device viewable by a call assistant having a screen area displaying the input text stored in the memory in ordered locations over the screen area;
   a word selection circuit providing for call assistant selection of at least one location on the screen corresponding to the text word;
   an edit text input circuit receiving a replacement text word from the call assistant and replacing the text word in the memory associated with the selected location with the replacement text; and
   output circuit transmitting the replacement text word stored in the memory to a remote user after a predetermined first delay.

2. The editing system of claim 1 wherein the display device operates to cease displaying the edited input text after at least a predetermined second delay after it has been transmitted by the output circuit.

3. The editing system of claim 1 wherein the display device displays the input text in lines ceases displaying entire lines after it has been transmitted by the output circuit whereby the remaining lines may be scrolled without horizontal displacement.

4. The editing system of claim 1 wherein the output circuit includes at least one input controlling the predetermined first delay according to a factor selected from the group consisting of: skill of the call assistant, an absolute transcription error rate, a preferred transcription error rate of the remote user, a preferred reception speed by the remote user, a location of the replacement text word within a unit of the input text.

5. The editing system of claim 4 wherein the first delay is adjusted downward when the replacement text is at the beginning of a unit of input text.

6. The editing system of claim 4 wherein the input circuit receives a data signal from the remote user indicating at least one of the preferred transcription error rates of the remote user and the preferred reception speed of the remote user.

7. The editing system of claim 1 wherein the word selection circuit is selected from the group consisting of a touch screen circuit associated with the display, a cursor control device controlling a cursor visually represented on the display.

8. The editing system of claim 1 wherein the input circuit includes a microphone and an audio output device, and wherein the voice signal is output to the call assistant by the audio output device whereby the call assistant may repeat the output voice signal into the microphone for transmission to the speech engine.

9. The editing system of claim 1 wherein the output circuit also transmits the voice signal to the remote user.

10. The editing system of claim 1 wherein the output circuit transmits the voice signal a third predetermined delay after it is received by the input circuit.

11. The editing system of claim 1 wherein the input circuit further receives a second voice signal from the remote user and wherein the audio output device provides the second voice signal to the call assistant with modified audio qualities to distinguish it from the first voice signal.

12. The editing system of claim 1 wherein the edit text input circuit includes a connection selected from the group consisting of a keyboard, a speech engine, and a display screen menu.

13. The editing system of claim 1 wherein the input circuit, the speech engine, the memory, the display device, the word selection circuit, the edit text input circuit, and the output circuit are implemented at least in part by a program executed on at least one electronic computer.

14. The editing system of claim 1 wherein the input circuit further includes a recording device recording the voice signal and having playback of the voice signal controllable by the call assistant to buffer the voice signal.

15. The editing system of claim 14 including a foot pedal and wherein the playback of the recording device is controlled by the foot pedal.

16. The editing system of claim 14 wherein the word selection circuit and edit text input circuit communicates with the recording device to cause a ceasing of playback of the recording device when the word selection circuit is activated prior to a replacement text being entered into the edit text input circuit.

17. The editing system of claim 14 wherein the display device further includes an indication of the amount of voice signal buffered by the recording device between a recording and playback point.

18. The editing system of claim 14 wherein the recording device further includes a silence compression circuit operating on the recorded voice signal prior to playback to reduce the length of silences in the voice signal.

19. The editing system of claim 18 wherein the silence compression circuit reduces the length of silences as a function of the duration of the voice signal buffered by the recording device.

20. The editing system of claim 19 wherein the silence compression circuit detects silence as any voice signal beneath a predetermined squelch level for a predetermined continuous period and replaces the detected silence with a predetermined silence replacement time.

21. The editing system of claim 1 wherein the input and output circuits communicate with at least one of the remote source and remote users through media selected from the group consisting of voice grade telephone lines, high speed data lines, and radio.

22. The editing system of claim 1 further including an auxiliary text input circuit activated by the call assistant to insert predefined text into the memory.

23. The editing system of claim 22 wherein the predefined text strings are selected from the group consisting of call progress text, conversation text, and initial word text.

24. The editing system of claim 23 wherein the initial words macros are selected from the group consisting of: "okay", "but", "hello", "oh", "yes", "um", "so", "well", "no", and "bye".

25. The editing system of claim 22 wherein the auxiliary text input circuit is activated via virtual buttons on the display device.

26. The editing system of claim 1 further including an auxiliary number input circuit activated by the call assistant to cause the transmission of call assistant selected DTMF tones to the remote user by the output circuit.

27. A method of transcribing voice comprising:
   (a) receiving a voice signal from a first user including at least one spoken word;
   (b) generating input text corresponding to the voice signal using a speech engine, the input text including a text word corresponding to the spoken word;
   (c) storing the input text in a memory;
   (d) displaying on a display device viewable by a call assistant and having a screen area, the input text stored in the memory in ordered spatial locations over the screen area;
   (e) selecting by a call assistant using a word selection circuit, at least one location on the screen corresponding to the text work;
   (f) via an edit text input circuit receiving a replacement text word from the call assistant and replacing the text word in the memory associated with the selected location with the replacement text; and
   (e) transmitting via an output circuit the replacement text word stored in the memory to a remote user after a predetermined first delay.

28. The method of claim 27 wherein the remote user is in the same location as the first user.

29. The method of claim 27 wherein the remote user is in a different location that the first user.

30. A voice transcription system comprising:
   an input circuit receiving a voice signal including at least one spoken word from a remote source and providing the spoken word to a call assistant;
   a keyboard operable by a call assistant providing for the input of text by the call assistant corresponding to the voice signal, the input text including a text word corresponding to the spoken word;
   output circuit transmitting the input text to a remote user;
   wherein the input circuit further includes a recording device recording the voice signal and having playback of the voice signal controllable by the call assistant to buffer the voice signal; wherein the recording device further includes a silence compression circuit operating on the recorded voice signal prior to playback to reduce the length of silences in the voice signal.

31. The voice transcription system of claim 30 including a foot pedal and wherein the playback of the recording device is controlled by the foot pedal.

32. The voice transcription system of claim 30 further including a display device providing an indication of the amount of voice signal buffered by the recording device between a recording and playback point.

33. The voice transcription system of claim 30 wherein the silence compression circuit reduces the length of silences as a function of the duration of the voice signal buffered by the recording device.

34. The voice transcription system of claim 33 wherein the silence compression circuit detects silence as any voice signal beneath a predetermined squelch level for a predetermined continuous period and replaces the detected silence with a predetermined silence replacement time.

* * * * *